United States Patent
Liu et al.

(10) Patent No.: US 6,449,947 B1
(45) Date of Patent: Sep. 17, 2002

(54) LOW PRESSURE INJECTION AND TURBULENT MIXING IN SELECTIVE CATALYTIC REDUCTION SYSTEM

(75) Inventors: Z. Gerald Liu, Madison, WI (US); Barry M. Verdegan, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/981,171

(22) Filed: Oct. 17, 2001

(51) Int. Cl.$^7$ ................................. F01N 3/00
(52) U.S. Cl. ..................... 60/286; 60/301; 60/324
(58) Field of Search ................. 60/286, 301, 324

(56) References Cited

U.S. PATENT DOCUMENTS

| | | |
|---|---|---|
| 3,380,810 A | 4/1968 | Hamblin |
| 3,645,093 A | 2/1972 | Thomas |
| 3,754,398 A | 8/1973 | Mattavi |
| 4,017,347 A | 4/1977 | Cleveland |
| 4,054,418 A | 10/1977 | Miller et al. |
| 4,538,413 A | 9/1985 | Shinzawa et al. |
| 4,651,524 A * | 3/1987 | Brighton ............... 60/274 |
| 4,652,286 A | 3/1987 | Kusuda et al. |
| 4,730,454 A | 3/1988 | Pischinger et al. |
| 4,732,743 A | 3/1988 | Schmidt et al. |
| 4,866,932 A | 9/1989 | Morita et al. |
| 4,902,309 A | 2/1990 | Hempenstall |
| 4,935,042 A * | 6/1990 | Sudo et al. ............... 60/311 |
| 4,955,183 A * | 9/1990 | Kolodzie et al. .......... 60/303 |
| 5,021,227 A | 6/1991 | Kobayachi et al. |
| 5,053,062 A | 10/1991 | Barris et al. |
| 5,063,737 A * | 11/1991 | Lopez-Crevillen et al. ... 60/286 |
| 5,082,478 A | 6/1992 | Oono et al. |
| 5,171,341 A | 12/1992 | Merry |
| 5,209,062 A | 5/1993 | Vollenweider |
| 5,322,537 A | 6/1994 | Nakamura et al. |
| 5,339,630 A | 8/1994 | Pettit |
| 5,453,116 A | 9/1995 | Fischer et al. |
| 5,457,945 A | 10/1995 | Adiletta |
| 5,584,178 A | 12/1996 | Naegeli et al. |
| 5,590,523 A * | 1/1997 | Fox ........................ 60/307 |
| 5,611,832 A | 3/1997 | Suzuki et al. |
| 5,643,536 A * | 7/1997 | Schmelz ................. 60/299 |
| 5,720,787 A | 2/1998 | Kasai et al. |
| 5,756,944 A * | 5/1998 | Battig et al. ............ 181/229 |
| 5,771,689 A | 6/1998 | Bareis et al. |
| 4,854,123 A | 8/1998 | Inoue |
| 5,802,844 A * | 9/1998 | Lee et al. ................ 60/286 |
| 5,833,932 A * | 11/1998 | Schmelz ................. 60/301 |
| 5,908,480 A | 6/1999 | Ban et al. |
| 5,992,141 A | 11/1999 | Berriman et al. |
| 6,003,305 A | 12/1999 | Martin et al. |
| 6,041,594 A | 3/2000 | Brenner et al. |
| 6,050,088 A | 4/2000 | Brenner |
| 6,314,722 B1 * | 11/2001 | Matros et al. ............ 60/286 |

* cited by examiner

Primary Examiner—Thomas Denion
Assistant Examiner—Diem Tran
(74) Attorney, Agent, or Firm—Andrus, Sceales, Starke & Sawall, LLP

(57) ABSTRACT

A selective catalytic reduction system for engine exhaust injects a source of ammonia, preferably an aqueous urea solution, or other ammonia solution, to preferably evaporate, decompose and hydrolyze to produce ammonia to react with and reduce NOx in the exhaust. A turbulence generator between the injector and a downstream catalyst enhances ammonia mixing upstream of the catalyst. A perforated reflector between the injector and the catalyst passes the exhaust through the perforations and reflects exhaust back toward the injector, to generate the turbulence to achieve enhanced ammonia mixing. A low pressure generator creates a low pressure evaporative diffusion enhancement zone at the injector accelerating evaporation rate and accelerating ammonia diffusion and mixing with the exhaust.

20 Claims, 2 Drawing Sheets

LOW PRESSURE INJECTION AND TURBULENT MIXING IN SELECTIVE CATALYTIC REDUCTION SYSTEM

BACKGROUND AND SUMMARY

The invention relates to selective catalytic reduction systems for internal combustion engine exhaust, including for use in industrial processes and in mobile and stationary diesel, natural gas and other engine applications.

Selective catalytic reduction (SCR) of nitrogen oxides (NOx) with urea or ammonia solution is known in industrial processes as well as in stationary diesel engine applications. In the SCR system, urea or ammonia solution is injected into the exhaust gas flow stream before the catalyst. Water in the droplets from the injection solution evaporates, leaving urea behind, which decomposes and hydrolyzes into ammonia, i.e. ammonia is produced through the process of droplet evaporation and urea chemical decomposition. NOx reacts with the ammonia and is catalytically reduced in the presence of such ammonia.

Thus far, SCR catalysts have not been successfully commercialized for mobile applications because of complexity. One of the many obstacles is that the limited space available in mobile applications makes it hard to evaporate droplets and decompose and hydrolyze the urea completely and achieve a high enough ammonia to NOx ratio. At low diesel engine exhaust temperatures and high gas flow velocities (e.g. about 20 meters per second), a distance of several meters (i.e. a time of 0.1 to 0.3 seconds) between the injector and the catalyst is required for the aqueous urea solution spray to vaporize, for urea to decompose and hydrolyze into ammonia and carbon dioxide, and for the ammonia to become uniformly distributed across the flow front before entering the catalyst. In order to be practical, this distance must be shortened to less than about 0.5 meters. Uniformity of the ammonia distribution is one of the key factors affecting the performance of the SCR system.

The present invention provides a selective catalytic reduction system which may be used in mobile applications. Evaporation rate is accelerated as well as the ammonia diffusion rate, in combination with enhancement of the noted ammonia mixing for reducing NOx.

DETAILED DESCRIPTION

Figure 1:
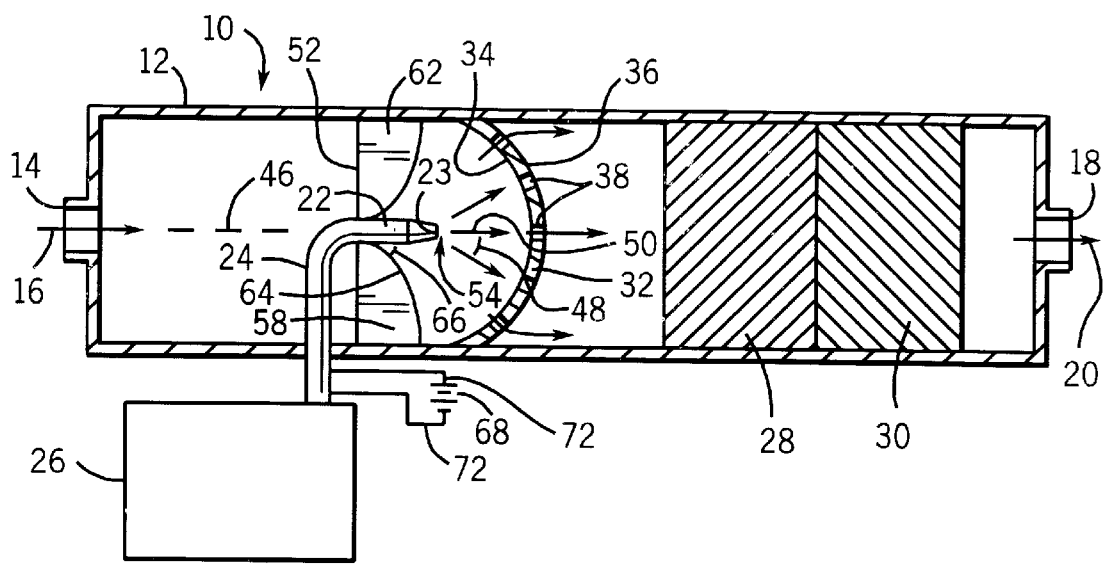
FIG. 1 is a side schematic sectional view of a selective catalytic reduction device in accordance with the invention.

FIG. 1 shows a selective catalytic reduction device 10 for internal combustion engine exhaust. The device includes a housing 12 having an upstream inlet 14 for receiving exhaust as shown at arrow 16, and a downstream outlet 18 for discharging the exhaust as shown at arrow 20. An injector 22 in the housing injects aqueous urea solution through tubular conduit 24 from reservoir or tank 26. As known, the urea solution evaporates, decomposes and hydrolyzes to produce ammonia to react with and reduce NOx in the exhaust by selective catalytic reduction in the presence of such ammonia. A catalyst is provided in the housing downstream of injector 22, including SCR catalyst 28 and oxidation catalyst 30.

Figure 2:
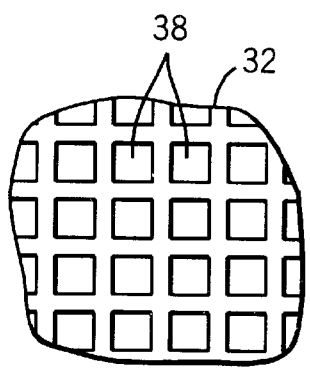
FIG. 2 is an end view of a portion of a component of FIG. 1.
Figure 3:
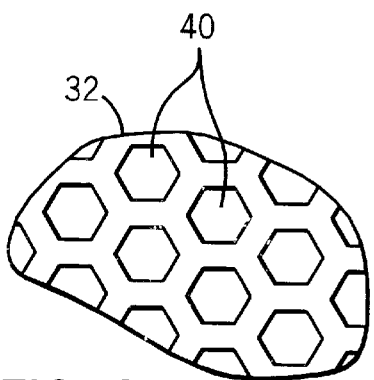
FIG. 3 is like FIG. 2 and shows another embodiment.
Figure 4:
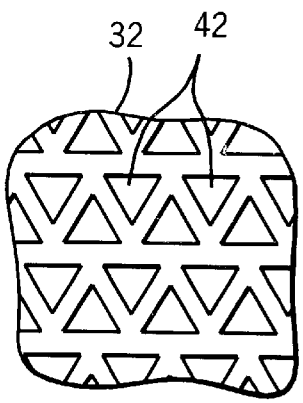
FIG. 4 is like FIG. 2 and shows another embodiment.
Figure 5:
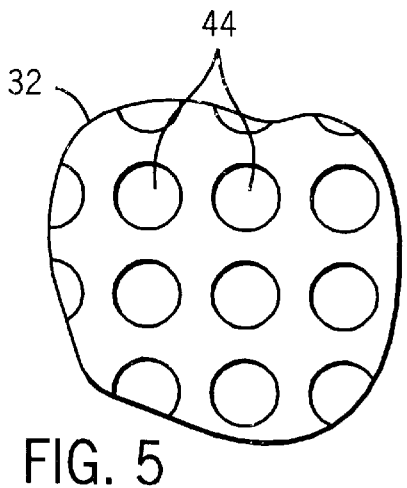
FIG. 5 is like FIG. 2 and shows another embodiment.

A turbulence generator 32 is provided in the housing between injector 22 and catalyst 28 and enhances ammonia mixing upstream of the catalyst. Turbulence generator 32 is a perforated reflector, preferably a bowl-shaped perforated member having an upstream side with a concave surface 34 facing injector 22, and a downstream side with a convex surface 36 facing catalyst 28. Bowl-shaped perforated member 32 has a plurality of perforations 38 through which exhaust flows. Concave surface 34 extends between such perforations and reflects exhaust toward injector 22. In preferred form, perforations 38 are square, FIG. 2. Square is preferred because it yields isotropic and homogeneous turbulent flow. In further embodiments, the perforations are hexagonal as shown at 40, FIG. 3, triangular as shown at 42, FIG. 4, or circular as shown at 44, FIG. 5. Other shapes are possible.

Concave surface 34 is preferably a hemisphere or some other portion of a sphere, with downstream injector tip 23 of injector 22 at the center of such sphere. In a further embodiment, concave surface 34 is parabolic as defined by a curve generated by a point moving so that its distance from a fixed point at injector tip 23 is equal to its distance from a fixed plane downstream of concave surface 34. Housing 12 extends axially along an axis 46, and exhaust flows generally axially through the housing. The noted fixed plane is perpendicular to axis 46. Injector 22 is on axis 46. Injector 22 injects urea solution along a spray angle 48 relative to axis 46. Parabolic surface 34 has a parabolic surface height 50 defined as the distance along axis 46 from injector tip 23 to the center of parabolic surface 34. Parabolic surface height 50 is a decreasing function of spray angle 48. The distance between injector 22 at downstream tip 23 and catalyst 28 is less than 0.5 meters.

Figure 6:
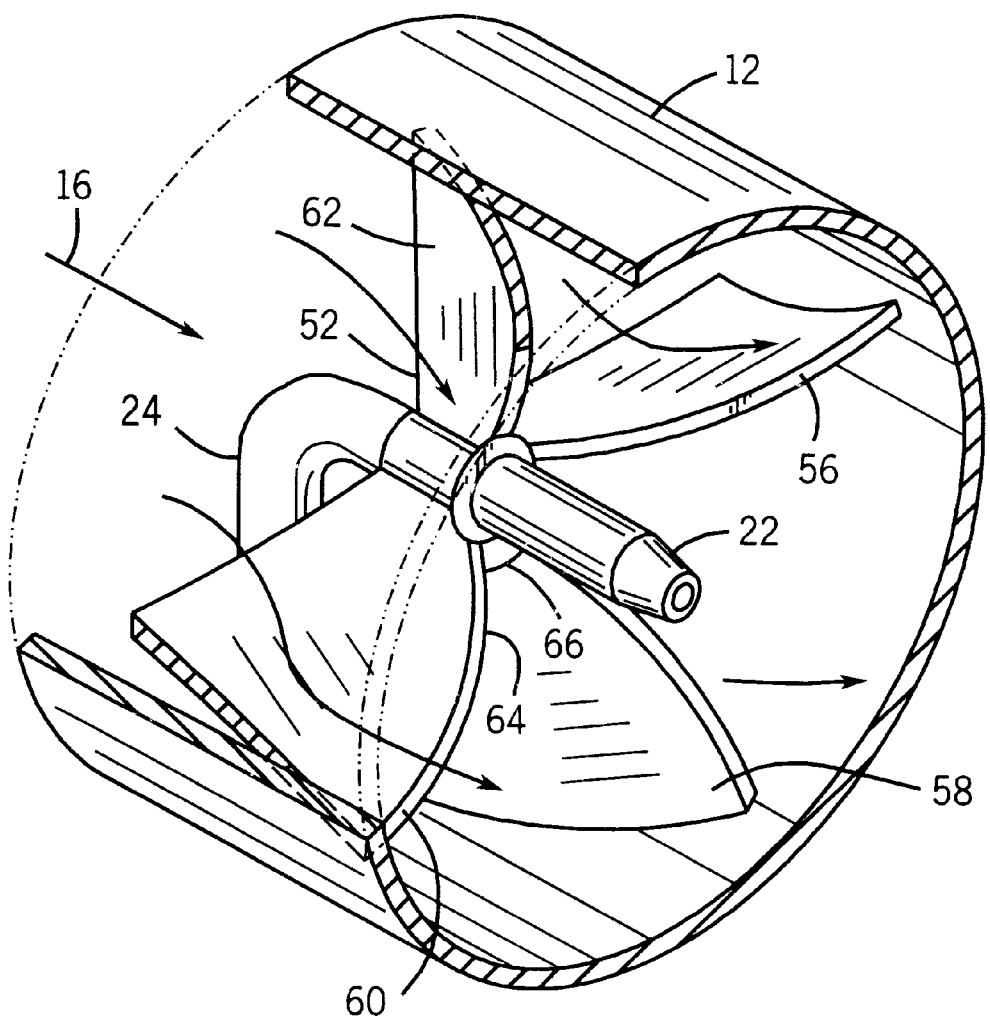
FIG. 6 is a perspective view of a component of FIG. 1.

A low pressure generator 52 is provided in housing 12 and creates a low pressure evaporative diffusion enhancement zone 54 accelerating the evaporation and diffusion rates of injected urea solution. Injector 22 is in such low pressure evaporative diffusion enhancement zone. Urea solution is injected from injector 22 into zone 54, which zone accelerates the evaporation rate and accelerates ammonia diffusion and transport. Turbulence generator 32 downstream of injector 22 enhances and accelerates mixing of the ammonia with the exhaust gas. Low pressure generator 52 is provided by a plurality of curved fins, e.g. 56, 58, 60, 62, FIG. 6, upstream of injector tip 23 and creating a swirl in the exhaust flow, which swirl creates low pressure evaporative diffusion enhancement zone 54 downstream of the fins. Urea injector or nozzle 22 atomizes the urea solution into low pressure evaporative diffusion enhancement zone 54. The low pressure evaporative diffusion enhancement zone accelerates evaporation of the aqueous urea solution droplets. The normal diffusion rate will increase because the diffusivity is inversely related to the pressure. The swirl flow also enhances the macro-mixing process of the ammonia with the exhaust gas due to convective transport. The noted fins have a downstream edge 64, FIG. 6, diverging from axis 46 along a fin angle 66 relative to axis 46. The noted parabolic surface height 50 is a decreasing function of fin angle 66.

Turbulence generator 32 is placed between injection nozzle 22 and catalyst 28. The homogeneity, intensity and isotropy of the downstream turbulence is controlled by the perforation pattern in member 32, the hole size, spacing between holes, and perforation porosity, i.e., density of the holes. The microscopic ammonia transfer is enhanced by the rapid eddy transport in the fully developed turbulent flow. The result is accelerated droplet evaporation rate and an improved ammonia mixing pattern.

In a further embodiment, the injector is heated by a heat source, in addition to heating by the exhaust. In one embodiment, the heat source is provided by a voltage source 68 external of the housing, and a pair of electrical conductors 70, 72 connecting the voltage source to the injector.

In the preferred embodiment, an aqueous urea solution is injected, as described, which evaporates, decomposes and hydrolyzes to produce ammonia to react with and reduce NOx in the exhaust. In further embodiments, other ammonia solutions or sources of ammonia may be used.

It is recognized that various equivalents, alternatives and modifications are possible within the scope of the appended claims, which distinctly define the subject matter regarded as the invention.

What is claimed is:

1. A selective catalytic reduction device for engine exhaust comprising:
   a housing having an upstream inlet for receiving said exhaust, and a downstream outlet for discharging said exhaust;
   an injector in said housing for injecting a source of ammonia to react with and reduce $NO_x$ in said exhaust;
   a catalyst in said housing downstream of said injector;
   a turbulence generator in said housing between said injector and said catalyst and enhancing ammonia mixing upstream of said catalyst,
   wherein said turbulence generator comprises a perforated reflector, said perforated reflector comprises a bowl-shaped perforated member having an upstream side with a concave surface facing said injector, said bowl-shaped perforated member has a plurality of perforations through which exhaust flows, and wherein said concave surface extends between said perforations and reflects exhaust toward said injector, and said perforations are triangular.

2. A selective catalytic reduction device for engine exhaust comprising:
   a housing having an upstream inlet for receiving said exhaust, and a downstream outlet for discharging said exhaust;
   an injector in said housing for injecting a source of ammonia to react with and reduce $NO_x$ in said exhaust;
   a catalyst in said housing downstream of said injector;
   a turbulence generator in said housing between said injector and said catalyst and enhancing ammonia mixing upstream of said catalyst,
   wherein said turbulence generator comprises a perforated reflector, said perforated reflector comprises a bowl-shaped perforated member having an upstream side with a concave surface facing said injector, said bowl-shaped perforated member has a plurality of perforations through which exhaust flows, and wherein said concave surface extends between said perforations and reflects exhaust toward said injector, and said concave surface is a portion of a sphere.

3. The selective catalytic reduction device according to claim 2 wherein said concave surface is a hemisphere.

4. The selective catalytic reduction device according to claim 2 wherein said injector has an injection tip at the center of said sphere.

5. The selective catalytic reduction device according to claim 2 wherein said housing extends axially along an axis and exhaust flows generally axially through said housing, and wherein said injector and the center of said sphere are on said axis.

6. The selective catalytic reduction device according to claim 2 wherein said source of ammonia is an aqueous urea solution which evaporates, decomposes and hydrolyzes to produce ammonia to react with and reduce $NO_x$ in said exhaust.

7. The selective catalytic reduction device according to claim 2 wherein said source of ammonia is an ammonia solution.

8. A selective catalytic reduction device for engine exhaust comprising:
   a housing having an upstream inlet for receiving said exhaust, and a downstream outlet for discharging said exhaust;
   an injector in said housing for injecting a source of ammonia to react with and reduce $NO_x$ in said exhaust;
   a catalyst in said housing downstream of said injector;
   a turbulence generator in said housing between said injector and said catalyst and enhancing ammonia mixing upstream of said catalyst,
   wherein said turbulence generator comprises a perforated reflector, said perforated reflector comprises a bowl-shaped perforated member having an upstream side with a concave surface facing said injector, said bowl-shaped perforated member has a plurality of perforations through which exhaust flows, and wherein said concave surface extends between said perforations and reflects exhaust toward said injector, and said concave surface is parabolic as defined by a curve generated by a point moving so that its distance from a fixed point at said injector is equal to its distance from a fixed plane downstream of said concave surface.

9. The selective catalytic reduction device according to claim 8 wherein said housing extends axially along an axis and exhaust flows generally axially through said housing, and wherein said fixed plane is perpendicular to said axis.

10. The selective catalytic reduction device according to claim 9 wherein said injector is on said axis.

11. The selective catalytic reduction device according to claim 10 wherein said injector injects said source of ammonia along a spray angle relative to said axis, said parabolic surface has a parabolic surface height which is defined as the distance along said axis from said injector to the center of said parabolic surface, and said parabolic surface height is a decreasing function of said spray angle.

12. The selective catalytic reduction device according to claim 8 wherein said source of ammonia is an aqueous urea solution which evaporates, decomposes and hydrolyzes to produce ammonia to react with and reduce $NO_x$ in said exhaust.

13. The selective catalytic reduction device according to claim 8 wherein said source of ammonia is an ammonia solution.

14. A selective catalytic reduction device for engine exhaust comprising:
   a housing having an upstream inlet for receiving said exhaust, and a downstream outlet for discharging said exhaust;
   a low pressure generator in said housing creating a low pressure diffusion enhancement zone;
   an injector in said housing injecting a source of ammonia in said low pressure diffusion enhancement zone to react with and reduce $NO_x$ in said exhaust, said low pressure diffusion enhancement zone accelerating mixing of said ammonia with said exhaust;

a catalyst in said housing downstream of said injector;

and further comprising in combination a turbulence generator in said housing downstream of said injector and enhancing mixing and transport of ammonia, wherein said turbulence generator comprises a perforated reflector, said perforated reflector comprises a bowl-shaped perforated member having an upstream side with a concave surface facing said injector, a downstream side with a convex surface facing said catalyst, and a plurality of perforations through which exhaust flows, and wherein said concave surface extends between said perforations and reflects exhaust toward said injector, and said concave surface is a portion of a sphere, said housing extends axially along an axis and exhaust flows generally axially through said housing, said injector has a downstream injection tip on said axis and at the center of said sphere.

15. The selective catalytic reduction device according to claim 14 wherein said source of ammonia is an aqueous urea solution which evaporates, decomposes and hydrolyzes to produce ammonia to react with and reduce $NO_x$ in said exhaust.

16. The selective catalytic reduction device according to claim 14 wherein said source of ammonia is an ammonia solution.

17. A selective catalytic reduction device for engine exhaust comprising:

a housing having an upstream inlet for receiving said exhaust, and a downstream outlet for discharging said exhaust;

a low pressure generator in said housing creating a low pressure diffusion enhancement zone;

an injector in said housing injecting a source of ammonia in said low pressure diffusion enhancement zone to react with and reduce $NO_x$ in said exhaust, said low pressure diffusion enhancement zone accelerating mixing of said ammonia with said exhaust;

a catalyst in said housing downstream of said injector;

and further comprising in combination a turbulence generator in said housing downstream of said injector and enhancing mixing and transport of ammonia, wherein said turbulence generator comprises a perforated reflector, said perforated reflector comprises a bowl-shaped perforated member having an upstream side with a concave surface facing said injector, a downstream side with a convex surface facing said catalyst, and a plurality of perforations through which exhaust flows, and wherein said concave surface extends between said perforations and reflects exhaust toward said injector, and said concave surface is parabolic as defined by a curve generated by a point moving so that its distance from a fixed point at said injector is equal to its distance from a fixed plane downstream of said concave surface, said housing extends axially along an axis and exhaust flows generally axially through said housing, said fixed plane is perpendicular to said axis, and said injector is on said axis.

18. The selective catalytic reduction device according to claim 17 wherein said injector has a downstream injection tip, and said low pressure generator comprises a plurality of curved fins upstream of said injector tip and creating a swirl in exhaust flow which swirl creates said low pressure diffusion enhancement zone downstream of said fins, and wherein said fins have a downstream edge diverging from said axis along a fin angle relative to said axis, said parabolic surface has a parabolic surface height which is defined as the distance along said axis from said injector to the center of said parabolic surface, and said parabolic surface height is a decreasing function of said fin angle.

19. The selective catalytic reduction device according to claim 17 wherein said source of ammonia is an aqueous urea solution which evaporates, decomposes and hydrolyzes to produce ammonia to react with and reduce $NO_x$ in said exhaust.

20. The selective catalytic reduction device according to claim 17 wherein said source of ammonia is an ammonia solution.

* * * * *